July 6, 1965
N. D. GOLDBERG
3,193,077
CONVEYOR GUIDE RAIL
Filed Aug. 13, 1962
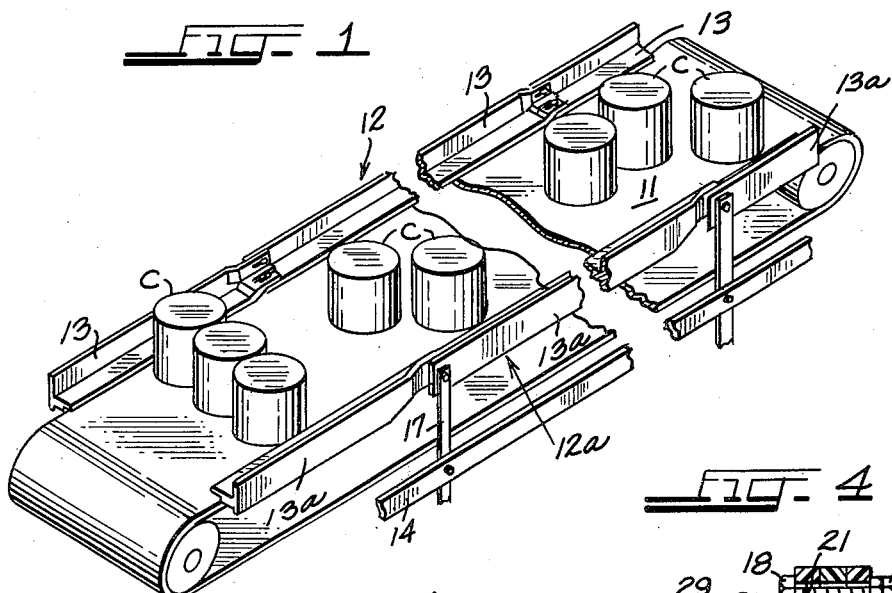
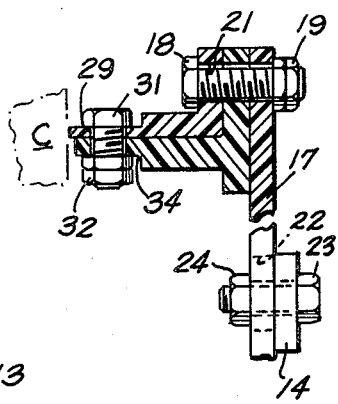
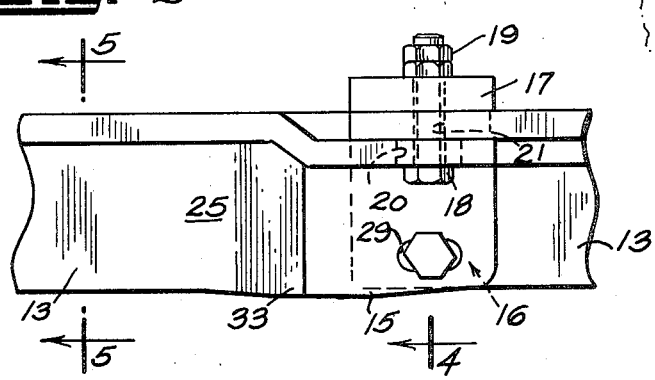
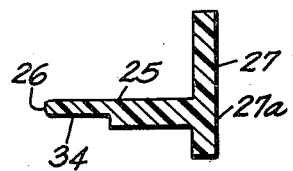
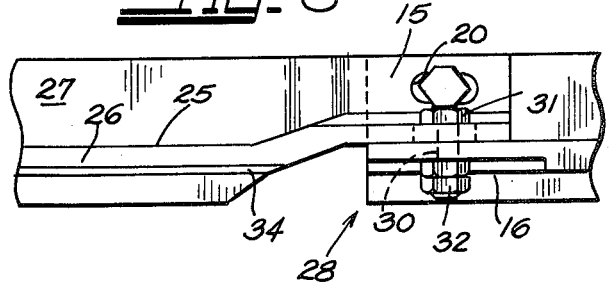
INVENTOR.
NAT D. GOLDBERG
BY

United States Patent Office 3,193,077
Patented July 6, 1965

3,193,077
CONVEYOR GUIDE RAIL
Nat D. Goldberg, 125 N. Racine Ave., Chicago, Ill.
Filed Aug. 13, 1962, Ser. No. 216,430
7 Claims. (Cl. 198—28)

This invention relates to conveyor structure; to means whereby damage to conveyor borne articles are kept minimal; and more particularly to a novel plastic guide bar providing structure for maintaining conveyor borne articles safely upon a moving conveyor while causing minimal or, more likely, no damage to the articles rubbing thereagainst. The present guide bar further is characterized by a unique joint construction for accommodating expansion and contractions of the plastic material from which the guide bar is formed.

The herein invention is primarily designed for use with a generally horizontal conveyor of the endless type; and, the conveyor may be an endless belt or chain structure, or, may include interconnected platforms, each pivotally connected to platform sections adjacent thereto. Each such conveyor requires some form of guide bar to maintain the borne along articles thereon. The herein invention, moreover, has particular application in the conveyor field designed for carrying along containers between station for pasturization, filling, capping and ultimate packaging. The present invention is of particular use and application for conveyor carried food and beverage containers; since the herein disclosed plastic guide bar will not corrode and readily cleans by steam sterilization.

In the preferred embodiment, the herein guide bar construction is made from a thermoplastic, such as Delrin, although it is to be understood other thermoplastics may be employed equally as well, which has a low coefficient of friction, and includes a plurality of interconnected sections mounted to the conveyor structure and having novel end constructions providing a novel joint for cooperable interconnection while being adapted to accommodate any expansion experienced in the plastic guide bar material. The guide bar structure is sufficiently "beefed up" to withstand pressure of articles rubbingly passing thereagainst and incudes a T-shaped cross-section for such purpose, the stem of the T-shaped cross-section providing a minimum surface area to the moving articles.

As mentioned hereinabove, guide bar structures are necessary to maintain the articles upon the moving conveyor. In the past, such guide bar structures generally consisted of stock metal rods, one-quarter inch in diameter or larger, welded to the conveyor structure. Experience has shown that such a metal guide bar structure causes damage to the finish and labels of countless articles rubbing thereagainst, which damaged articles must, of course, be removed from general output. Also, as the iron stock becomes damaged and burred, it develops sharp abrasive surfaces which further cut into and gauge the labels on the moving articles, or the lithographing or finish thereon. Contrastingly the material comprising the herein guide bar structure presents little resistance to articles passingly rubbing thereagainst, and further will not develop sharp points or burrs; and consequently causes the most negligible of damage to labels and finish.

The guide bar of the present invention further is characterized by, and contributes to, the following additional special features: the thermoplastic guide bar presents little frictional resistance, and consequently less damage to, all container finishes and labelling than does that of known guide rods; the plastic guide bar construction appreciably reduces the noise level; it is adjustable to different desired heights; the herein guide bar does not readily contaminate, being made from plastic material; it is easily cleaned by rapid steam sterilization; and it is installed in a minimum of tme and without the requirement of special skills or tools.

The foregoing and other objects, advantages and features of construction will become more apparent from a consideration of the following description together with the accompanying drawing.

In the drawing:

FIGURE 1 is a perspective view of the present invention as installed upon a conveyor;

FIGURE 2 is an enlarged typical partial plan view in the area of the novel joint construction;

FIGURE 3 is an enlarged typical partial elevation view of said joint construction;

FIGURE 4 is a cross-sectional view taken along line 4—4 in FIGURE 2; and

FIGURE 5 is a cross-sectional view taken along line 5—5 in FIGURE 2.

Referring to the drawings, the guide bar comprising the herein invention is illustrated as employed with a conveyor of the endless belt type 11, although it equally may be employed with other moving conveyor constructions. The belt 11, further, is illustrated as carrying several rows of containers C; although, it should be understood that the belt 11 may be of any width or adapted to carry along a single of line of such containers C. To either side to belt 11 there is present a guide rail 12, 12a, arranged for positioned be sides the belt 11 to maintain containers C thereupon. The guide rails 12, 12a, respectively, comprise a plurality of guide rail sections 13, 13a.

As seen in FIGURES 1 and 4 the guide rail sections 13, 13a may be mounted to the conveyor structure 14. For the purpose of clarity of disclosure, the end of each guide rail section 13 and 13a foremost in the direction of conveyor flight will be referred to as the guide rail section forward end 15 while the other end 16 will be referred to as the rearward end. With this in mind, the sections 13, 13a, may be mounted to structure 14 by means of an extension arm 17, connected to structure 14, and a bolt 18 and nut 19 arrangement extending through a substantially horizontal slot 20, in the forward end of a guide rail sections 13 or 13a, and through a hole 21 in the rearward end of the adjacent guide rail sections. Each extension arm 17 may be provided with a substantially vertical slot 22 through which may be passed a conventional bolt 23 which with nut 24 may adjustably raise or lower arm 17 with respect to structure 14, and accordingly raise or lower the guide rail sections 13, 13a with respect to the belt 11.

Each of the guide rail sections 13, 13a is substantially T-shaped in cross-section, as seen in FIGURE 5, and the trunk 25 of the T lies in a generally horizontal plane, the edge 26 presenting a minimal surface against which rubs the containers C as they are borne along by belt 11. It is the upper portion 27 of the cross-arm 27a of the T, at the forward end 15 of each section 13 or 13a, wherein the slot 20 is provided, while in the upper portion 27 of the rearward end of each section 13, or 13a may be found the hole 21.

As seen in FIGURE 2, at the forward end 15 of the sections 13 or 13a, the upper portion 27 of the cross-arm 27a of the T, above described, is formed or displaced from its normal plane and with respect to the edge 26; and, as seen in FIGURE 3, at the forward end 15 of the sections 13 or 13a the trunk 25 of the T, above described, is formed or displaced vertically with respect to the trunk portion 25 of the rearward end 16 of the adjacent section 13 or 13a. In this manner, a novel joint 28 construction is provided and the forward ends 15 of the guide rail sections 13 or 13a may be nestingly fitted to and against the rearward ends 16 of guide rail sections adjacent thereto. Also, for stability of connection, the forward end 15 of each guide rail section 13 or 13a, in the trunk portion 25 also may be provided with a slot 29, the trunk 25 of the rearward end 16 of adjacent section may be provided with a hole 30, and a bolt 31 and nut 32 arrangement passing therethrough may be employed to assure better connection between adjacent guide rail sections 13 or 13a. In any case, the displaced area of the trunk 25 and cross-arm 27 are of sufficient size to permit sliding engagement between adjacent sections 13 or 13a.

The sections 13, 13a are made from a plastic material since such material is relatively inexpensive, easy to install and form, and adaptable to ready cleaning while being non-toxic and thus employable around foods and beverages. In their preferred embodiment, the sections are made from a thermoplastic such as the material known as Delrin, which is strong, has a low coefficient of friction, is long wearing and has all the desirable characteristics above mentioned. Nevertheless, is should be understood that other thermoplastic materials may also be employed.

Such materials, however, despite their advantages, do also have some drawbacks. Chief among these are the fact that they expand under pressure or load, particularly in the presence of moisture and heat. Consequently, if the guide rail sections 13 or 13a were firmly anchored, they would ultimately buckle, deform, break or work themselves loose. Such failure would, of course, defeat the use of the material, and it thus became evident that the sections 13 or 13a could not be completely firmly anchored. After experimentation, it was found that the best results were secured with the construction described hereinbefore. Principally this involves firmly anchoring only one end of each section 13 or 13a, and using the slotted construction at the other end to permit relative movement of such other end with respect to the anchored end of the adjacent section 13 or 13a. Experience further has shown that a guide rail section 13 or 13a approximately thirty-six inches in length works ideally, experiencing not too great an expansion while, at the same time, requiring not too great a size slot 20 or 28 which conceivably, if too large, would become a depository for dirt. The plastic sections 13, 13a, preferably are formed by injection molding processes well known to those skilled in such art.

Because the edge of the end of the edge 26 of the guide rail sections 13 or 13a, conceivably could or may present a possible sharp surface to the travelling containers C, the adjacent edges 26 of adjacent sections may be slightly displaced from each other at the area of the joint 28. As exemplified in FIGURE 2, this is accomplished by a slight wedged areas 33 provided in the forward ends 15 of the sections 13 or 13a, said areas 33 extending outwardly with respect to the edges 26 of the rearward ends of 16 of adjacent sections.

It also may be desired to provide variously shaped guide rails at certain portions of conveyor flights, which shapes are not adaptable to mass production methods, and are better formed, as the guide rails are installed from rod stock. To accommodate connection to such rod stock, the guide rail sections 13 or 13a are provided with a notched area 34 through which holes may be drilled, as desired, for connecting the rod stock to the sections by conventional means. The notched area 34 is provided the entire length of each section 13 or 13a and the latter thus may be cut at any point for connection to such rod stock.

It thus is seen that the herein invention provides a conveyor plastic guide rail structure arranged to accommodate the expansion and stresses experienced thereby; the sections comprising the guide rails being nestingly fitted together by a novel joint construction whereby each section is firmly secured at one end thereof and held at its other end in such a manner as to accommodate material expansion without failure. Moreover, because of the inherent nature of the material from which the guide rails are formed, the guide rails will not injure or destroy container labels or finish. The rails may be positioned adjustably with reference to the belt 11 and the containers C thereon to accommodate various sizes and shapes of containers. The latter feature also allows vertical settings of the rails to positions whereat they will not hit container labels and the like.

Although what has been shown and described are preferred embodiments of the invention, it is to be understood that these are not intended to be exhaustive nor limiting the invention, but instead are given for the purpose of illustration so that the invention may be better understood, and that others skilled in the art may be able to modify and adjust the invention without departing from the spirit thereof, the scope of which is defined in the appended claims.

What is claimed is:

1. The combination with a conveyor and frame structure therefore, of guide rails along either side of the flight of said conveyor and including a plurality of guide rail sections, each rail section including an elongated plastic body substantially T-shaped in cross-section, positioned on its side whereby the trunk portion lies in a generally horizontal plane and the cross-arm lies in a generally vertical plane, the edge of the trunk portion being positioned adjacent conveyor flight whereby conveyor borne articles guidingly pass thereagainst, each rail section at one end thereof having the upper portion of its cross-arm displaced to a generally vertical plane closer to said trunk portion edge, each rail section at said one end further having its trunk portion displaced vertically to a higher horizontal plane whereby adjacent ends of said rail sections are nestingly engaged, and means for connecting said rail sections to said frame structure and in sliding engagement with each other.

2. The combination in claim 1 wherein said means includes a generally horizontal slot near an end of each rail section and a hole coincidental therewith in the end of the rail section adjacent thereto, and fastener means extending through said slot and said hole, connecting adjacent sections and permitting sliding engagement therebetween.

3. The combination in claim 1 wherein the displacement of said trunk portion is substantially the thickness thereof, whereby adjacent rail sections present edges of substantially uniform level along conveyor flight, and a wedge shaped area on the edge of each trunk portion in the region of nesting engagement between adjacent rail sections and increasing in area in the direction of conveyor flight whereby a substantially smooth uninterrupted edge is presented for guiding contact by conveyor borne articles.

4. The combination with a conveyor, of guide rails arranged at either side of conveyor flight, each guide rail including a plurality of rail sections and each rail section including an elongated plastic body generally T-shaped in cross-sections, including a trunk portion in a generally horizontal plane whereby the edge thereof is positioned adjacent conveyor flight and a cross-arm portion substantially perpendicular to said trunk portion, each rail section at an end thereof having its trunk portion displaced vertically, each rail section further at an end thereof having its cross-arm portion displaced whereby adjacent ends of rail sections are nestingly and slidably engaged, and means for connecting adjacent rail sections for said sliding engagement.

5. The combination in claim 4 wherein said means includes in each rail section a slot in an end thereof and a hole in the other end thereof, said slot and said hole being in the areas of sliding engagement, and fastener means extending between coincidental slots and holes of adjacent sections.

6. Conveyor guide rail structure comprised of a plurality of rail sections, each rail section including an elongated plastic body having a first portion extending longitudinally the length thereof and having an edge positionable adjacent conveyor flight to maintain articles thereupon, and a second longitudinal portion connected with and at an angle to said first longitudinal portion, each rail section at an end thereof having its longitudinal portions displaced whereby each rail section at the ends thereof is nestingly and slidingly engageable with another rail section, and means for maintaining adjacent rail sections in sliding engagement.

7. The rail structure recited in claim 6 wherein said means includes in the areas of sliding engagement of each rail section, a slot near one end and a hole in the other end whereby a hole and a slot in adjacent sections are positionable coincidentally, and a fastener for extension between the coincidental slot and hole of adjacent sections.

References Cited by the Examiner
UNITED STATES PATENTS

| | | | |
|---|---|---|---|
| 790,811 | 5/05 | Alvey | 198—204 X |
| 928,365 | 7/09 | Cowley | 198—204 X |

FOREIGN PATENTS 1,100,364  9/55  France.

SAMUEL F. COLEMAN, *Primary Examiner.*

WILLIAM B. LA BORDE, ERNEST A. FALLER, Jr.,
*Examiners.*